(No Model.)

J. GIBBONS.
ROPE FASTENER.

No. 249,334. Patented Nov. 8, 1881.

Witnesses.
C. J. Mattison.
D. E. Paul

Inventor.
John Gibbons,
by
William H. Low,
Attorney.

UNITED STATES PATENT OFFICE.

JOHN GIBBONS, OF WEST TROY, ASSIGNOR OF TWO-THIRDS TO CHARLES R. HICKS AND JOHN H. REYNOLDS, BOTH OF TROY, NEW YORK.

ROPE-FASTENER.

SPECIFICATION forming part of Letters Patent No. 249,334, dated November 8, 1881.

Application filed September 6, 1881. (No model.)

*To all whom it may concern:*

Be it known that I, JOHN GIBBONS, of West Troy, in the county of Albany and State of New York, have invented a new and useful Improvement in Adjustable Eyes for Fastening on Ropes, Straps, &c., of which the following is a specification.

My invention relates to improvements in adjustable eyes for attaching to ropes, straps, and other material used for cattle-ties and other similar appliances; and it consists in combining a griping-eye adapted to fit a rope, strap, &c., and provided with a screw-threaded stem projecting radially therefrom, a nut fitted to screw on the stem of the griping-eye, provided with a loop or eye for receiving a hook or other attaching device, and a sleeve or socket adapted to fit over the screw-stem of the griping-eye and to receive the pressure of the nut in such manner that the rope or strap will be griped between the lower part of the griping-eye and the lower end of the sleeve, to hold the device firmly in any required position on the rope or strap.

The object of my invention is to provide an eye that can be readily adjusted and securely held in any place on a rope or strap when it is required.

Figure 1:
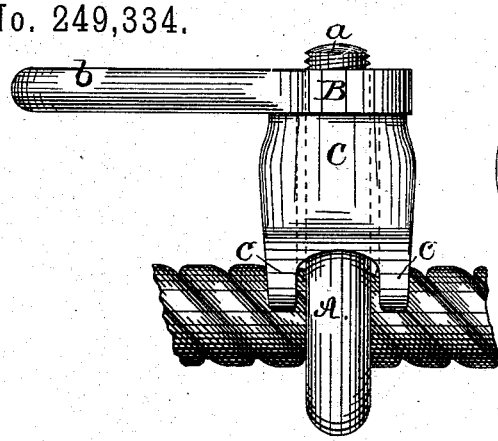
Figure 2:
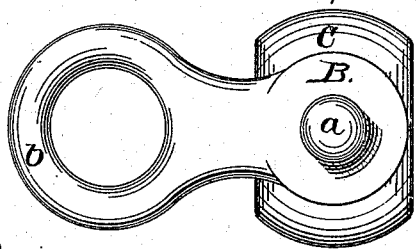
Figure 3:
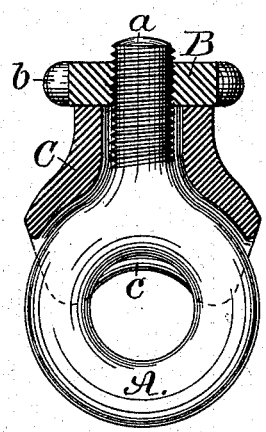
Figure 4:
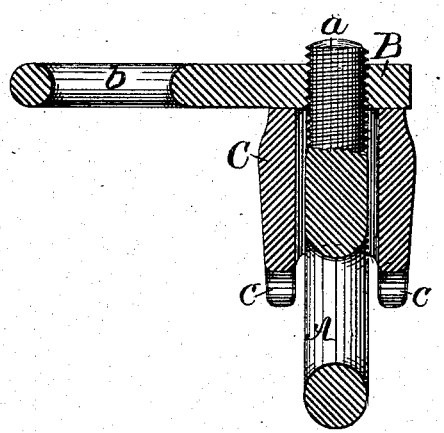
Figure 5:
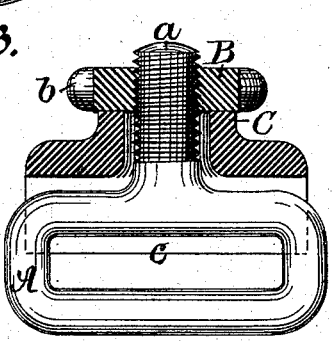

In the accompanying drawings, which form part of this specification, and to which reference is made herein, Figure 1 is a side elevation of my invention as applied to a rope; Fig. 2, a plan view; Fig. 3, an elevation, with the sleeve in section; Fig. 4, a side elevation, with the nut and sleeve in section; and Fig. 5, a modified form of the device as adapted to use on a strap.

As represented in the drawings, A is the griping-eye, made of metal, and of any size and form suited to the use to which it is to be applied. A stem, $a$, projects radially from the periphery of said eye, and is provided with a suitable screw-thread cut thereon.

B is a nut fitted to screw on the thread on the stem $a$, and provided with an eye, $b$, which projects laterally from one side of said nut.

C is a socket or sleeve, formed to slip freely over the stem $a$, and terminating at its lower end in the cheeks $c$, which pass down at each side of the eye A, and are fashioned at their lower ends either to fit a rope, as shown in Fig. 3, or a strap, as shown in Fig. 4.

The mode of attaching my improved eye is as follows: The nut B is first sufficiently slackened to permit the device to slip freely on the rope or strap until it reaches the required position, and then by screwing down the nut B the rope or strap is clamped between the bottom of the socket C and the lower part of the eye A with sufficient tenacity to retain the device in position against any reasonable strain.

I claim as my invention—

1. An adjustable eye for attaching to ropes, straps, &c., composed of a griping-eye, A, provided with a radial stem, $a$, having a screw-thread cut thereon, a nut, B, provided with an eye, $b$, and fitted to screw on the stem $a$, and the sleeve C, adapted to slip over the stem $a$, and provided with pendent cheeks $c$, all constructed and arranged to operate as herein specified.

2. In an adjustable eye for attaching to ropes, straps, &c., the combination, with a griping-eye, A, provided with the radial stem $a$, as herein described, of the nut B, provided with an eye, $b$, and the socket C, said nut and socket being arranged in relation to the eye A as herein set forth—that is to say, so that a rope or strap passing through the eye A may be clamped between the lower part of said eye and the socket—as and for the purpose herein specified.

JOHN GIBBONS.

Witnesses:
WILLIAM H. LOW,
J. H. REYNOLDS.